United States Patent [19]
Bergquist et al.

[11] 3,975,245

[45] Aug. 17, 1976

[54] ELECTROLYTE FOR ELECTROCHEMICAL MACHINING OF NICKEL BASE SUPERALLOYS

[75] Inventors: Everett John Bergquist, Glastonbury; Lawrence Joseph Jennings, Manchester, both of Conn.

[73] Assignee: United Technologies Corporation, Hartford, Conn.

[22] Filed: Dec. 5, 1975

[21] Appl. No.: 638,209

[52] U.S. Cl.................. 204/129.95; 204/129.75
[51] Int. Cl.² ............................................. C25F 3/02
[58] Field of Search....... 204/129.75, 129.8, 129.85, 204/129.95

[56] References Cited
UNITED STATES PATENTS

| | | | |
|---|---|---|---|
| 2,874,104 | 2/1959 | Bowerman et al. | 204/129.95 |
| 3,054,737 | 9/1962 | Salt | 204/129.95 |
| 3,242,062 | 3/1966 | Covington | 204/129.95 |

Primary Examiner—T. M. Tufariello
Attorney, Agent, or Firm—Charles E. Sohl

[57] ABSTRACT

An electrolyte useful in the electrochemical machining of the high strength nickel base superalloys is described. The electrolyte is an aqueous solution containing nitric acid, hydrochloric acid and citric acid in specific quantities. Nickel base superalloys electrochemically machined using the electrolyte of the invention possess extremely smooth machined surfaces which are free from smut and other undesirable surface problems.

5 Claims, No Drawings

ELECTROLYTE FOR ELECTROCHEMICAL MACHINING OF NICKEL BASE SUPERALLOYS

BACKGROUND OF THE INVENTION

1. Field of the Invention

This invention relates to the field of electrolytes used in the electrochemical machining of nickel base superalloys.

2. Description of the Prior Art

Electrochemical machining (ECM) involves the controlled removal of metal from a workpiece by anodic dissolution in an electrolytic cell in which the workpiece is the anode and the tool is the cathode. The electrolyte is pumped through the gap between the tool and the workpiece while a direct current is passed through the cell at a low voltage so as to dissolve metal from the workpiece. The ECM process is analogous to reverse electroplating.

ECM can be used to do work that would be difficult or impossible to do by other means. The work possible by ECM includes machining of extremely hard materials and the machining of odd shaped and/or small deep holes. ECM is widely used in the gas turbine industry for the production of small holes for air cooling in gas turbine blades.

The electrolytes used in the past for the electrochemical machining usually involve aqueous solutions of inorganic salts such as sodium chloride, potassium chloride, sodium nitrate and sodium chlorate. Other electrolytes such as sulphuric acid and hydrochloric acid solutions have been used in certain instances.

The electrolyte has three main functions in the ECM process. It carries the current between the tool and the workpiece, it removes the product of the reaction from the cutting region, and it removes the heat produced by the current flow in the operation.

Electrolytes must have high conductivity, low toxicity and corrosivity, and chemical and electrochemical stability.

Sludge is a material formed during the ECM process and consists mainly of metal hydroxides and other reaction products. Under some conditions, as much as 100 cubic inches of sludge may be produced for each cubic inch of metal removed by the ECM process. Smut consists of extremely fine particles of alloy constituents, mainly metallic. Both sludge and smut are undesirable since they interfere with the ECM process and are difficult to remove from the finished part. As a general rule, solutions of inorganic salts such as sodium chloride are sludging electrolytes. the other general type of electrolyte is termed nonsludging. For example, solutions of strong acids tend to retain the anodically removed metal in solution and thus do not produce sludge under normal conditions. the use of solutions of mild inorganic acids as electrochemical machining electrolytes does not appear to be common. Most acids used in electrolytes for electrochemical machining are the strong mineral acids such as nitric, sulphuric, and hydrochloric acid.

Of course, many types of acid mixtures have been used as chemical etching agents without the assistance of electric current. For example, in U.S. Pat. No. 3,524,817 the use of nitric acid and citric acid for the chemical deburring of zinc is described. In U.S. Pat. No. 2,849,297 the use of nitric and hydrochloric acids for cleaning and polishing magnesium is described. U.S. Pat. No. 3,753,817 describes the use of a mixture of nitric, hydrochloric and acetic acids for use in etching nickel alloy wire. U.S. Pat. No. 3,709,824 describes the use of phosphoric, nitric and hydrochloric acids for the polishing of stainless steel surfaces. In U.S. Pat. No. 3,275,560 the use of hydrochloric and nitrix acid mixtures for cleaning various metals is described. None of these preceding U.S. patents involves the use of such acid mixtures in electrochemical machining.

SUMMARY OF THE INVENTION

The present invention includes an electrolyte for use in the electrochemical machining of nickel base superalloys. The electrolyte is an aqueous solution containing nitric acid in an approximate concentration of 60 milliliters per gallon, hydrochloric acid in an approximate concentration of 50 milliliters per gallon and citric acid in an approximate concentration of one pound per gallon. This electrolyte produces extremely satisfactory results when used with several nickel base superalloys of the kind which contain a gamma prime second phase in a gamma matrix. The electrolyte produces essentially equal attack on all of the common phases found in nickel base alloys and is further characterized by being nonsludging and producing no smut.

The foregoing, and other objects, features and advantages of the present invention will become more apparent in the light of the following detailed description of the preferred embodiment.

DESCRIPTION OF THE PREFERRED EMBODIMENTS

Unless otherwise noted, all percentages listed herein are weight percentages.

Electrochemical machining is extensively used in the production of intricate shapes from hard materials. Typical of common ECM applications is the production of cooling holes in gas turbine blades. Such holes are typically very small in diameter and quite deep relative to the diameter and must extend into the blade at a precisely controlled angle. ECM techniques have been used in the past to produce such holes, however, satisfactory results have not always been obtained because of the deficiencies in the prior electrolytes. Such deficiencies include the production of rough machined surfaces due to unequal attack of the different phases which make up nickel base superalloys and the deposit of insoluble smut on the interior of the hole. Such insoluble smut interferes with the subsequent application of protective coatings to the blade which are used to reduce oxidation in service. The prior electrolytes used in drilling of holes in nickel base superalloys have generally been based upon either inorganic salts such as sodium chloride or strong mineral acids such as nitric, sulphuric, and hydrochloric acids. Nickel base superalloys are those alloys which possess good elevated temperature strength, and usually contain aluminum and/or titanium.

The present electrolyte consists of an aqueous solution of two strong mineral acids, nitric and hydrochloric acid in combination with a significant quantity of a mild organic acid, citric acid. The resultant electrolyte produces extremely desirable finished machine surfaces which are free from smut and other impurities.

Nitric acid is used in a concentration from about 10 to about 300 milliliters per gallon of an acid having a density of 42 Be. Hydrochloric acid is used in the form of an acid having a strength of approximately 36%. This acid is added to the aqueous solution in a concentration from about 40 to about 150 milliliters per gallon. Citric acid is supplied in dried powdered form and used in the concentration from about 0.5 to about 3 pounds per gallon. These three acidic compounds (or components) are used in a form having a purity known as technical purity which is a relatively pure grade. Of course, other acid grades of different strength may be used with appropriate adjustments in quantity. The function of the three acidic components is believed to be as follows. The combination of nitric and hydrochloric acids attack the major phases found in nickel base superalloys at a substantially equal rate, the nitric preferentially attacking gamma and the hydrochloric attacking the gamma prime phase. the citric acid is believed to largely eliminate the smutting problem. The following specific electrolyte concentration has been successfully used on a large scale basis to drill holes in cast nickel base superalloy turbine blades. Hydrochloric acid in a concentration of about 50 milliliters per gallon, nitric acid in a concentration of about 60 milliliters per gallon, and citric acid in a concentration of about one pound per gallon. This solution has good chemical stability and with proper in process filtration techniques can be used for long periods in the hole drilling operation before the buildup of metal ions in the solution requires its replacement. This electrolyte has produced excellent results on several nickel base superalloys such as directionally solidified MAR-M 200 + Hf and INCONEL738 when used with an applied voltage of from about 7 to about 20 volts. Particular success has been obtained in the EC machining of alloy MAR-M200 + Hf, which contains (nominally) 9% Cr, 10% Co, 2% Ti, 5% Al, 0.15% C, 12% W, 1% Cb, 2% Hf, 0.015% B, balance essentially nickel and alloy IN 738 which contains (nominally) 16% Cr, 8.5% Co, 3.5% Ti, 3.5% Al, 0.12% C, 2.6 W, 1.75% Ta, 0.8% Cb, 0.012% B, 0.1% Zr balance essentially nickel. Both of these alloys had previously been EC machined only with the greatest difficulty.

The controls which are employed to ensure that the proper composition electrolyte is maintained include measuring the total normality of the electrolyte in hydrogen ion concentration and controlling this normality within the range of 2.0 and 2.2. A further test involves the use of a specific ion electrode which measures the chloride concentration and the chloride concentration is maintained at a range equivalent to that produced by from 40 to 60 milliliters per gallon of hydrochloric acid. This specific solution has produced excellent results on the majority of nickel base superalloys tested, however, for certain nickel base superalloys which contain unusual alloying elements it may be necessary or desirable to change the ratio of the constituents within the range previously cited so as to produce a substantially equal attack of the different phases which may be present in the alloy, in particular the ratio of nitric to hydrochloric acids may be adjusted to ensure equal attack of the gamma and gamma prime phases, two of the major phases present in nickel base superalloys.

Although the invention has been shown and described with respect to a preferred embodiment thereof, it should be understood by those skilled in the art that various changes and omissions in the form and detail thereof may be made therein without departing from the spirit and the scope of the invention.

Having thus described a typical embodiment of our invention, that which we claim as new and desire to secure by Letters Patent of the United States is:

1. An electrolyte for electrochemical machining comprising an aqueous solution containing from about 10 to about 300 ml/gal nitric acid, from about 40 to about 150 ml/gal hydrochloric acid, and from about 0.5 to about 3 lbs/gal of citric acid.

2. An electrolyte as in claim 1 useful for the electrochemical machining of nickel base superalloys, wherein the nitric acid concentration is about 60 ml/gal, the hydrochloric acid concentration is about 50 ml/gal and the citric acid concentration is about 1 lb/gal.

3. A process of electrochemically machining nickel base superalloy articles including the steps of:
   a. providing the nickel base superalloy article,
   b. immersing the article in an aqueous solution containing from about 10 to about 300 ml/gal of nitric acid, from about 40 to about 150 ml/gal of hydrochloric acid and from about 0.5 to about 3 lbs/gal of citric acid,
   c. applying a voltage of from about 7 to about 20 volts between the workpiece and tool, with the workpiece being anodic and the tool being cathodic.

4. A process as in claim 3 wherein the nominal composition of the nickel base superalloy is about 9% Cr, 10% Co, 2% Ti, 5% Al, 0.15% C, 12% W, 1% Cb, 2% Hf, 0.015% B, balance essentially nickel.

5. A process as in claim 3 wherein the nominal composition of the nickel base superalloy is about 16% Cr, 8.5% Co, 3.5% Ti, 3.5% Al, 0.12% C, 2.6% W, 1.75% Ta, 0.8% Cb, 0.012% B, 0.1% Zr, balance essentially nickel.

* * * * *